United States Patent [19]

Plimpton

[11] Patent Number: 4,738,549

[45] Date of Patent: Apr. 19, 1988

[54] POOL THERMOMETER

[76] Inventor: R. Gregory Plimpton, P.O. Box 14545, N. Palm Beach, Fla. 33408

[21] Appl. No.: 847,476

[22] Filed: Apr. 3, 1986

[51] Int. Cl.$^4$ .......................... G01K 1/08; G01K 1/10; G01K 11/12

[52] U.S. Cl. ..................................... 374/208; 374/156; 374/161

[58] Field of Search ............... 374/161, 109, 156, 162, 374/159, 208

[56] References Cited

U.S. PATENT DOCUMENTS

| | | | |
|---|---|---|---|
| 496,783 | 5/1893 | Hicks | 374/156 |
| 2,641,930 | 6/1953 | Kebbon | 374/156 |
| 3,520,189 | 7/1970 | Mann | 374/156 |
| 3,576,129 | 4/1971 | Crites | 374/161 |
| 3,580,079 | 5/1971 | Crites | 374/162 |
| 3,817,103 | 6/1974 | Diamond et al. | 374/104 |
| 3,827,301 | 8/1974 | Parker | 374/162 |
| 3,830,224 | 8/1974 | Vanzetti et al. | 128/736 |
| 3,861,213 | 1/1975 | Parker | 374/161 |
| 3,864,976 | 2/1975 | Parker | 374/161 |
| 3,893,340 | 7/1975 | Parker | 374/161 |
| 3,898,354 | 8/1975 | Parker | 374/162 |
| 3,951,133 | 4/1976 | Reese | 128/736 |
| 3,961,531 | 6/1976 | Peng | 374/156 |
| 3,965,742 | 6/1976 | Parker | 374/161 |
| 4,019,368 | 4/1977 | Navato | 374/162 |
| 4,030,361 | 6/1977 | Fortune | 374/156 |
| 4,044,614 | 8/1977 | Beckman | 374/208 |
| 4,169,378 | 10/1979 | Dimarchi et al. | 374/156 |
| 4,408,905 | 10/1983 | Ehrenkranz | 374/157 |
| 4,410,282 | 10/1983 | Leger et al. | 374/156 |
| 4,419,952 | 12/1983 | Weiler | 116/216 |
| 4,435,095 | 3/1984 | Jones et al. | 374/208 |
| 4,447,164 | 5/1984 | Berndt | 374/162 |
| 4,464,064 | 8/1984 | D'Luzansky | 374/101 |
| 4,467,278 | 8/1984 | Toth et al. | 324/95 |

FOREIGN PATENT DOCUMENTS

| | | | |
|---|---|---|---|
| 1917510 | 10/1970 | Fed. Rep. of Germany | 374/156 |
| 0026236 | 2/1983 | Japan | 374/162 |

OTHER PUBLICATIONS

"Pool & Spa News", (May 19, 1985), p. 164.

Primary Examiner—Charles Frankfort
Assistant Examiner—T. B. Will
Attorney, Agent, or Firm—Steele, Gould & Fried

[57] ABSTRACT

A thermometer adapted for immersion in a liquid includes a monolithic casing matrix. A plurality of liquid crystal display portions are embedded in the casing matrix. The liquid crystal display portions each have a liquid crystal agent with an optically perceivable condition at a temperature or temperature range. Indicia of the temperature or temperature ranges can also be provided.

17 Claims, 1 Drawing Sheet

U.S. Patent     Apr. 19, 1988     4,738,549
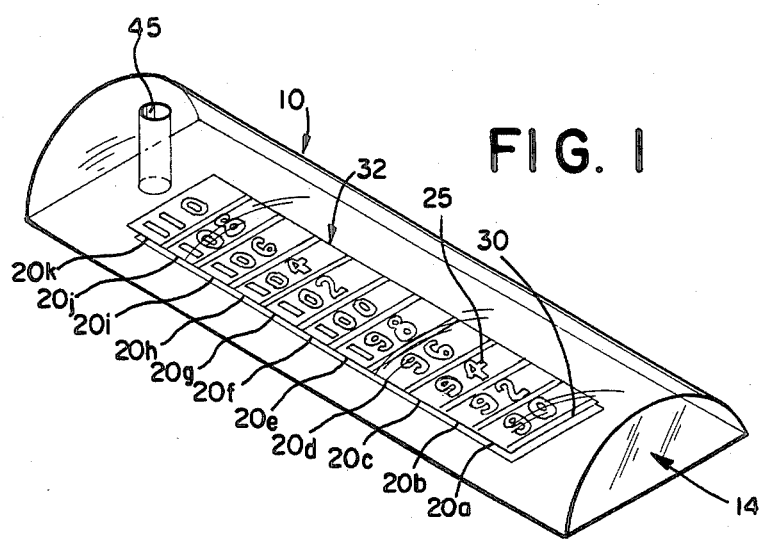
FIG. 1
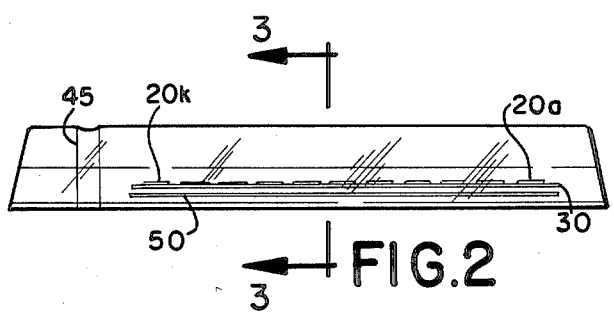
FIG. 2
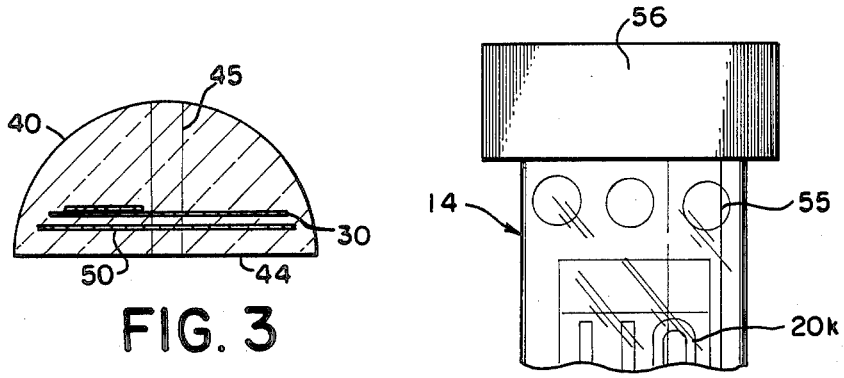
FIG. 3
FIG. 4

POOL THERMOMETER

BACKGROUND OF THE INVENTION

1. Field of the Invention

This invention relates generally to thermometers, and more particularly to thermometers adapted for immersion in liquids.

2. Description of the Prior Art

It is desirable to know the temperature of water in which people will sit, swim, and bathe. Hot tubs, for example, can be dangerous if the temperature of the water is too high. Swimming pools are uncomfortable if the water temperature is not proper. It is desirable to know the temperature of bath water for the safety and comfort of children. Thermometers of one sort or another have in the past been used in these settings. Some of these are designed to be placed into the water for a short period of time until the thermometer has attained a steady reading. The thermometer is then removed from the water, its temperature is read, and it is set aside for later use. These thermometers cannot be left in the water owing to their fragile nature and the danger of broken glass, mercury contamination and the like.

Attempts have been made to provide thermometers which are designed to remain in the water. These thermometers can be complicated and expensive owing to the numerous seals and magnification aids that must be provided. They often cannot withstand the very rugged wear brought about by playful activity in the swimming pool or bathtub. Metal thermometers may rust. Other thermometers lose their calibration when jarred and become useless. Thermometers sometimes must be mounted in a permanent position, and are not adaptable to a variety of locations. These thermometers cannot be removed from the water for easy reading. Thermometers will sometimes quickly lose their temperature reading when removed from the water because they quickly exchange heat with the surrounding atmosphere.

SUMMARY OF THE INVENTION

It is an object of the invention to provide a thermometer which can be left immersed in water or other fluids for extended periods of time.

It is another object of the invention to provide a thermometer which can withstand rugged wear.

It is yet another object of the invention to provide a thermometer which will not rapidly lose its accuracy when removed from water for reading.

It is still another object of the invention to provide a thermometer which can be used safely around children.

It is another object of the invention to provide a thermometer which will not readily lose its calibration.

It is yet another object of the invention to provide a thermometer which is easily read.

It is still another object of the invention to provide a thermometer which is not expensive to produce.

It is another object of the invention to provide a thermometer which can include advertising or other indicia.

These and other objects are accomplished by a thermometer which comprises a plurality of liquid crystal display portions in a casing. Each display portion contains a different liquid crystal agent with an optically perceivable condition at a different temperature or temperature range. Indicia of the temperatures or temperature ranges at which the liquid crystal agents of the display portions have their optically perceivable condition are preferably provided. The display portions are preferably operable at incrementally different temperatures to provide an incremental indication of temperature over a range of temperatures.

The liquid crystal display portions are preferably mounted on a backing. The liquid crystal agents at each display portion can be confined in a transparent capsule which can be bonded to the backing. The liquid crystal display portions are preferably disposed about the backing in an orderly arrangement of increasing or decreasing temperatures. In this arrangement the thermometer is more easily read. The indicia are preferably printed as numerals over the capsules, but can also be provided adjacent the capsules or liquid crystal display portions.

The liquid crystal agents may be selected from a group of materials known for this purpose. A useful class of liquid crystal agents are the cholesteric esters. Known liquid crystal agents are operable from about 15° F. to about 160° F.

The casing can be fashioned from a number of synthetic materials which characteristically are moldable, thermally conductive, water impermeable, and at least partially transparent. It is additionally desirable that the material be durable and substantially shatterproof. One suitable material is a cured polyester resin. An ultraviolet attenuator can be included in the casing material to resist degradation of the casing by sunlight.

The casing is preferably configured to allow easy reading of the thermometer strip. The casing can accordingly be made substantially convex in shape above the thermometer strip to magnify the liquid crystal display portions and indicia. Additional structure may be added to the casing to facilitate placement of the thermometer. A bore, for example, can be fashioned through the casing to receive an attachment cord. Flotation means can be provided to keep the thermometer near the surface of the water.

The casing is preferably dimensioned such that a significant casing mass surrounds each display portion. The mass of material around each display portion will hold the temperature of the liquid crystal agents near the temperature of the water for a period of time after the thermometer has been removed from the water.

BRIEF DESCRIPTION OF THE DRAWINGS

There are shown in the drawings forms and embodiments which are presently preferred it being understood, however, that the invention is not limited to the precise arrangements and instrumentalities shown, wherein:

FIG. 1 is a perspective view of a thermometer according to the invention.

FIG. 2 is a side elevation of a thermometer according to the invention.

FIG. 3 is an enlarged cross section taken along line 3—3 in FIG. 2.

FIG. 4 is a side elevation of a thermometer according to the invention including flotation structure.

DETAILED DESCRIPTION OF THE PREFERRED EMBODIMENTS

Referring to FIGS. 1-3, there is shown a thermometer 10 including a casing matrix 14. Embedded within the monolithic casing matrix 14 are liquid crystal display portions 20a–k. The liquid crystal display portions each contain a liquid crystal agent which has an optically perceivable condition at a temperature or temperature range. The thermometer 10 preferably includes indicia 25 of the temperature or temperature range at which the liquid crystal agents have their optically perceivable conditions. The indicia are preferably numerical representations of the temperature in degrees farenheit or centigrade, but can also be a qualitative representation of the temperature.

The liquid crystal display portions are preferably provided in sufficient numbers to indicate increments of temperatures over a desired range. In the illustrated embodiment for a hot tub thermometer, for example, the liquid crystal display portions 20a–k each contain a different liquid crystal agent which has an optically perceivable condition at temperatures ranging from 90° F. to 110° F., in increments of 2° F. A thermometer for a pool would have liquid crystal display portions with a lower range of operating temperatures, perhaps 64° F.–84° F.

The liquid crystal display portions 20a–k may be affixed to a backing 30 to form a thermometer strip 32. The backing 30 may be a strip of a suitable material such as plastic. The liquid crystal display portions are preferably disposed about the backing in an orderly arrangement of increasing or decreasing or decreasing temperatures. In this arrangement the thermometer is more easily read. The liquid crystal display portions 20 may alternatively be directly embedded in the casing 14.

The liquid crystal agents are preferably encapsulated in transparent capsules. The indicia may be provided on the transparent capsules themselves as shown, on the backing adjacent to the capsules, or in any other convenient location. A variety of ready-made thermometer strips can be purchased which have liquid crystal display portions and indicia representing numerous temperature ranges. The Hallcrest Company of Chicago, Ill., is one manufacturer of these thermometer strips.

Liquid crystal agents suitable for use with the invention may be selected from a host of agents known for this purpose. Known liquid crystal agents have optically perceivable conditions at temperatures ranging from about 15° F. to about 160° F. These agents are known to consistently change color, transparency, or have some other optically perceivable condition at relatively precise and predetermined temperatures or narrow temperature ranges. A suitable class of liquid crystal agents is the cholesteric esters.

The casing should be manufactured from a material which is at least partially transparent so that temperature readings are easily made. The material should be water impermeable. The material should also have a sufficient thermal conductivity such that the liquid crystal agents embedded therein are raised to the temperature of the fluid in which the thermometer is immersed for accurate temperature readings. The material should preferably be shock and shatter resistent, and also resistent to scratching and wearing. Some materials will form a scale on standing in water. It is, therefore, desirable that the material be resistent to such scale formation. The casing material may be selected from a number of materials which satisfy all or most of these characteristics. One such material is an unsaturated polyester in monomer which is cured by a suitable agent such as methyl ethyl ketone peroxide.

An ultraviolet attenuator may be included in the casing material to resist degradation by sunlight. One suitable ultraviolet attenuator would be Tinuvin, manufactured by the Ciba-Geigy Corporation. The ultraviolet attenuator may be mixed with the resin when forming the casing.

The casing may be fashioned in numerous sizes and styles. This provides a significant casing mass around the liquid crystal display portions 20a–k and the liquid crystal agents contained therein. The casing mass helps to hold the temperature of the liquid crystal display portions 20a–k constant for a short period of time after the thermometer has been removed from the fluid. The thermometer will then give an accurate reading for a period of time after removal from the water. The casing 14 surrounding each display portion 20 is preferably at least one-eighth inch thick.

It is preferable to fashion the casing 14 so that the liquid display portions 20 are magnified for easy temperature reading. Convex surface 40 can be fashioned in the casing portion over the liquid display portions 20a–k. The convex surface 40 may be conviently provided by fashioning a substantially hemispherical casing (FIG. 3). In one embodiment, the casing 14 is four inches in length and hemispherical in cross section with a one-half inch radius. The thermometer strip 32 is approximately one-quarter inch from a base 44 of the casing 14.

Mounting structure may be provided to permit placement of the thermometer wherever desired. A bore 45 through the casing 14 will allow attachment of a cord or the like so that the thermometer may be hung from the side of a pool or hot tub, to be drawn upward for temperature readings and then replaced into the water. The bore 45 can be drilled into the casing matrix 14. It is, of course, possible to fashion mounting brackets or other structure into the casing to permit attachment as desired.

It is sometimes desirable to provide flotation structure in conjunction with the thermometer to float the thermometer at or near the surface of the water. The flotation structure may, for example, be a cap 56 (FIG. 4) of a suitable buoyant material which can be affixed to the casing 14 by suitable means such as an adhesive. It is alternatively possible to provide alternative bouyancy means such as buoyant material embedded directly into the casing 14 during molding. The embedded material can be conveniently provided in the form of pellets 55 which can be introduced directly into the casing material during the molding process.

Thermometers according to the invention can be formed by molding processes. In one such process, a first portion of casing material is placed into a bottom mold portion. A thermometer strip 32 is laid onto this bottom casing portion. The top mold portion is then set in place, and a top casing portion is placed into the mold to fill the mold cavity and allowed to cure to complete the thermometer. A buoyant material such as pellets 55 can be mixed into the casing material before curing if a buoyant thermometer is desired. The bore 45 can be directly molded into the casing as an alternative to drilling.

A number of attractive inlays can be made during the molding process. It is, for example, possible to mold a transparent bottom casing portion and then a colorful, nontransparent casing layer portion. The thermometer is then completed as described above. The nontransparent casing portion is a colorful backdrop to the thermometer strip and an aid to reading the liquid crystal display portions.

A thermometer according to the invention can easily bear advertising indicia. This can be conveniently provided as a plate or strip 50 which can be directly molded into the casing 14.

Thermometers according to the invention are especially useful for hot tubs, pools, baths and the like. The water impermeable casing allows the thermometer to be left in the water for extended periods of time. The rugged casing material can withstand bumps and jars, and therefore the thermometer does not present a danger to playing occupants, especially children. The casing material will hold the temperature reading constant for a period of time so that the thermometer can be lifted out of the water for easy reading. Reading is facilitated by the provision of a convex surface in the casing. The thermometer can be inexpensively produced from available components. While especially useful for immersion in water, it is possible to use the thermometer in other liquids with proper casing material selection.

This invention can be embodied in other forms without departing from the spirit or essential attributes thereof, and accordingly reference should be made to the appended claims, rather than to the foregoing specification, as indicating the scope thereof.

I claim:

1. A waterproof thermometer for insertion in a liquid comprising a seamless integrally molded plastic casing having a thin transparent side and a thick side, said casing having a UV attenuator throughout, and a plurality of liquid crystal display portions in said casing, said liquid crystal display portions being visible through said thin side of said casing, and each liquid crystal portion having an optically perceivable condition for indicating a specific temperature or temperature range.

2. The thermometer of claim 1, wherein said liquid crystal display portions are disposed about a backing, said backing being embedded in said casing.

3. The thermometer of claim 1, wherein said casing comprises means for optically magnifying said liquid crystal display portions.

4. The thermometer of claim 3, wherein said magnification means comprises at least one convex surface fashioned into said casing.

5. The thermometer of claim 1, further comprising flotation means.

6. The thermometer of claim 5, wherein said flotation means comprises buoyant material affixed to said casing.

7. The thermometer of claim 5, wherein said flotation means comprises buoyant material embedded within said casing.

8. The thermometer of claim 1, further comprising structure for positioning said thermometer within a liquid.

9. The thermometer of claim 8, including positioning means comprised of a bore through said casing.

10. The thermometer of claim 1, further comprising advertising indicia embedded in said casing.

11. The thermometer of claim 1, wherein said casing is at least one-eighth inch thick.

12. The thermometer of claim 1, wherein said liquid crystal display portions are formed from a cholesteric ester.

13. The thermometer of claim 1, wherein said casing is formed from a polyester resin.

14. The thermometer of claim 13, wherein said casing is fashioned from unsaturated polyester cured with methyl ethyl ketone peroxide.

15. The thermometer of claim 1, further comprising indicia of said temperatures or temperature ranges at which said liquid crystal display portions have their optically perceivable condition.

16. The thermometer of claim 15, wherein said indicia are numerals.

17. A waterproof thermometer for insertion in a liquid comprising a seamless integral plastic molded casing having a thin side and a thick side and a plurality of liquid crystal display portions in said casing, said liquid crystal display portions being visible through said thin side, and each liquid crystal portion having an optically perceivable condition for indicating a specific temperature or temperature range, said casing being formed by molding a thin casing portion having a UV attenuator and a thick casing portion having a UV attenuator together with said liquid crystal display portions therebetween, said thick and thin portions being cured so as to form a seamless, integral, waterproof casing.

* * * * *